Fields & Townsend
Tanning Leather.
No. 1,955. Reissued May 9 1865.
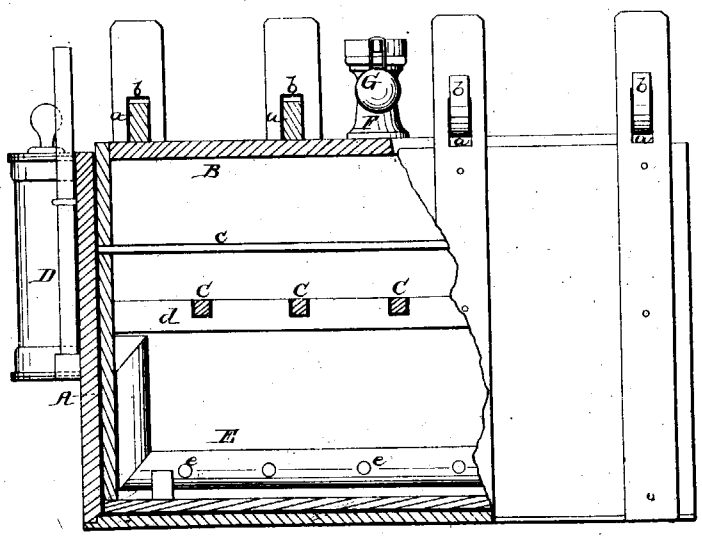
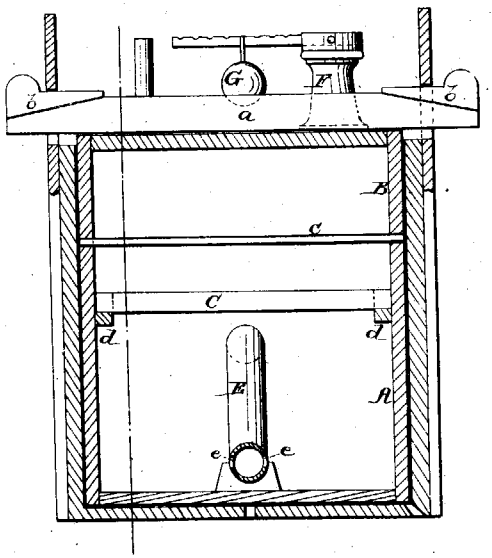
Witnesses;
C. L. Topliff
C. A. W. Reed
Inventors;
William Fields
J. Townsend
per Munn & Co
Attorneys
N. PETERS, PHOTO-LITHOGRAPHER, WASHINGTON, D. C.

UNITED STATES PATENT OFFICE.

SIMON H. KENNEDY AND HENRY L. ELDER, OF PHILADELPHIA, PENNSYLVANIA, ASSIGNEES OF WILLIAM FIELDS AND ISRAEL TOWNSEND.

IMPROVEMENT IN TANNING HIDES AND SKINS.

Specification forming part of Letters Patent No. 43,013, dated June 7, 1864; Reissue No. 1,849, dated January 10, 1865; Reissue No. 1,955, dated May 9, 1865.

*To all whom it may concern:*

Be it known that WILLIAM FIELDS and ISRAEL TOWNSEND, of Wilmington, in the county of New Castle and State of Delaware, assignors of SIMON H. KENNEDY and HENRY L. ELDER, of Philadelphia, in the county of Philadelphia and State of Pennsylvania, have invented a new and useful Improvement in Tanning Hides and Skins; and we do hereby declare that the following is a full, clear, and exact description thereof, which will enable those skilled in the art to fully understand and use the same, reference being had to the accompanying drawings, forming part of this specification, in which—

Figure 1 represents a transverse vertical section of an apparatus by means of which the said invention may be explained. Fig. 2 is a side elevation of the same, partly in section.

Similar letters of reference indicate like parts.

This invention consists in exposing hides and skins to the action of liquor of any desired description by the aid of an air-tight vat and of gaseous fluid under pressure introdueed into said vat so as to agitate the liquor and cause the same to act on the hides, and with increased effect.

It consists further in the employment or use for the purpose of tanning hides and skins of a current of air applied to said hides or skins under a pressure of from five to twenty or more pounds to the square inch, acting in combination with the ordinary or other tanning-liquors in such a manner that the compressed air is caused to circulate through the liquor, and, by its action on the tanning-liquid, is forced into the hides or skins, and at the same time, by the motion of the air in the vat, the hides are constantly brought in contact with fresh air, and the handling of the hides and all the labor connected therewith can be saved.

The invention consists finally in the arrangement of one or more pipes extending to the interior of an air-tight vat, in combination with said vat, with a pump, and with a loaded valve in such a manner that air or other fluid forced through the pipe into the vat will agitate the liquors contained therein, and will not be allowed to escape until it reaches a certain pressure, when the loaded valve opens and, by the action of the pump, a continuous current of fluid under pressure is passed through the vat, whereby the effect of the liquor on the hides and skins is considerably increased.

A represents a vat made of wood or other suitable material sufficiently strong and capable of resisting the action of the liquors used in the operation of liming, drenching, and tanning hides and skins. It is closed by a cover, B, which is held down by cross-bars *a* and wedges *b*, or in any other convenient manner, and which must be made so that it fits air-tight into the top of the vat. In order to effect this purpose the vat is provided in its interior with a rim, *c*, and a piece of packing placed between this rim and the lower edge of the cover renders the joint tight; but we do not wish to confine ourselves to this precise mode of securing the cover, as this operation can be effected in many different ways, and will necessarily be altered according to the construction of the vat.

The hides or skins to be tanned in the vat are suspended from a series of cross-bars, C, which are supported by notched rails *d* secured to the interior of the vat, one opposite the other, as clearly shown in Fig. 1.

D is a pump, which is secured to one end of the vat A, and which communicates with a pipe, E, extending throughout the entire length of the vat and close down to its bottom, as shown in Fig. 2. This pipe is perforated with holes *e* so that the air or other fluid forced in by the pump will agitate the liquor contained in the vat, and by its action said liquor is caused to act on the hides and skins with increased effect.

The agitation of the liquor is effected by applying to the cover or any other part of the vat an opening, which may be closed by a valve, F, loaded with an adjustable weight, G, or by any other suitable device, so that it can be made to open at any desired pressure. In practice we use an ordinary safety-valve, loaded to a pressure of from five to twenty pounds to the square inch, and as soon as the pressure of the air or other fluid in the interior of the vat reaches this point, the valve opens and a continuous current of compressed air or other fluid passes through the vat as long as the motion of the pump is not discontinued.

A suitable gage, H, applied to the side of the vat, indicates the amount of pressure in the same, and by the combined action of the pump, perforated pipe, and loaded valve the hides or skins in the vat are exposed to the action of a continuous current of compressed air or other fluid, so that the handling of the hides can be dispensed with and the operation of tanning is completed in a few days, and with much less labor than by the ordinary method of tanning in a compressed or open atmosphere. Our method is also applicable to liming and drenching hides or skins with good advantage.

What we claim as new, and desire to secure by Letters Patent, is—

1. The within-described method of treating hides preparatory to or during the process of tanning, by exposing them to the action of liquor of any desired description by the aid of an air-tight vat and of gaseous fluid, under pressure, introduced into said vat so as to agitate the liquor and cause the same to act on the hides and skins with increased effect.

2. The employment or use for the purpose of tanning hides and skins of a current of air or other gas applied to said hides or skins under a pressure of from five to twenty or more pounds to the square inch, acting in combination with the ordinary or other tanning liquors, substantially as and for the purpose set forth.

3. The arrangement of one or more pipes, extending to the interior of an air-tight vat, in combination with said vat, with a pump, and loaded valve, constructed and operating substantially as and for the purpose described.

SIMON H. KENNEDY.
HENRY L. ELDER.

Witnesses:
R. B. CHAMPION,
E. H. BARNUM.